Sept. 7, 1937.  C. J. KELLER  2,092,255
APPARATUS FOR FORMING TUBULAR ARTICLES
Filed June 17, 1935  17 Sheets-Sheet 1

INVENTOR
Clarence J. Keller
BY
Spencer Hardman & Fehr
his ATTORNEYs

Sept. 7, 1937.  C. J. KELLER  2,092,255
APPARATUS FOR FORMING TUBULAR ARTICLES
Filed June 17, 1935    17 Sheets-Sheet 3

INVENTOR
Clarence J. Keller
BY
Spencer Hardman & Fehr
his ATTORNEYs

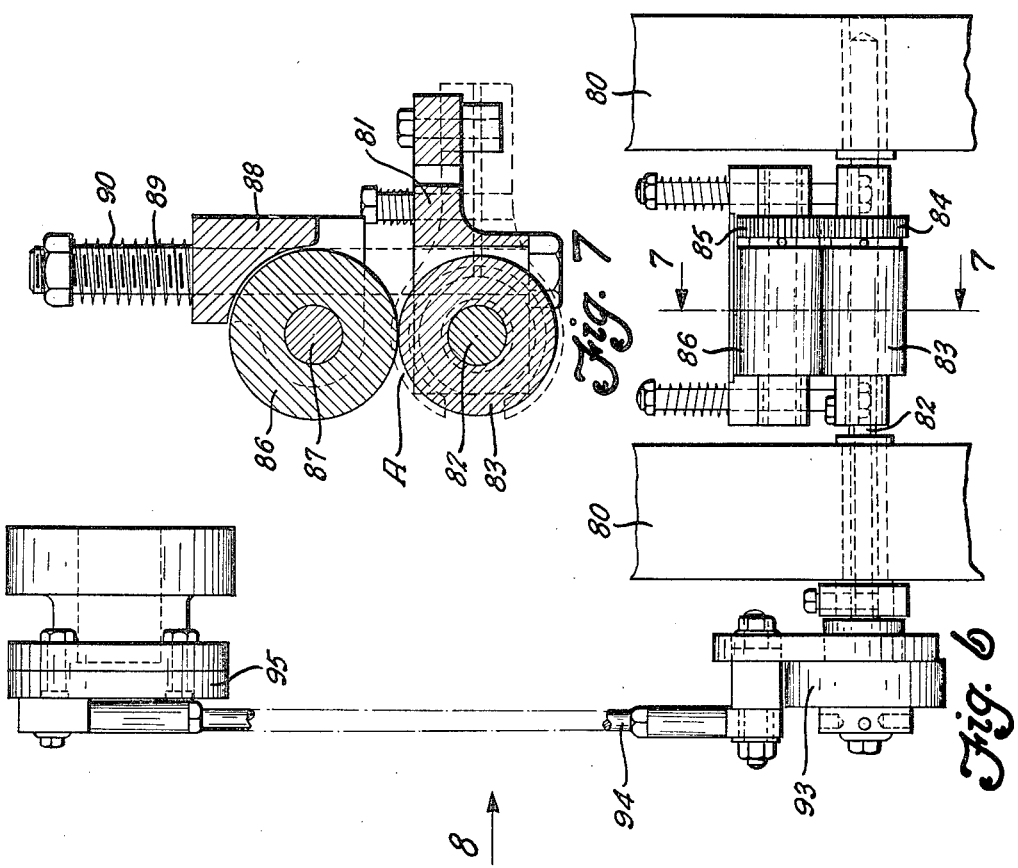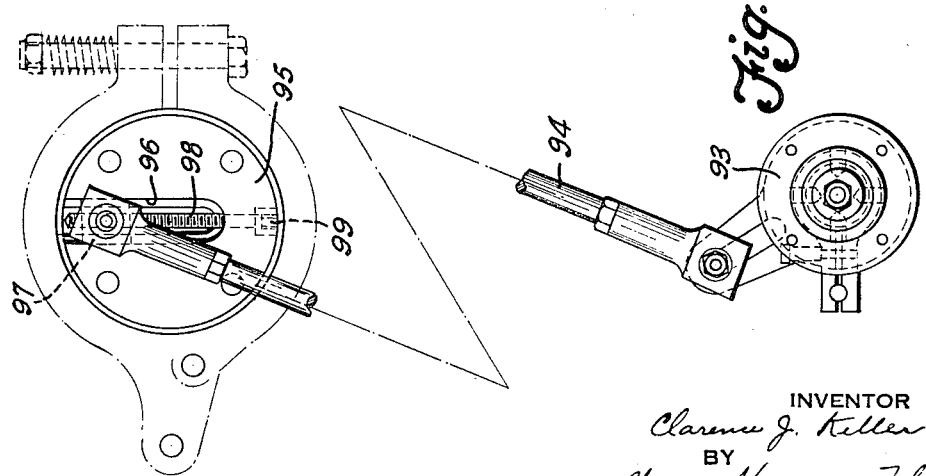

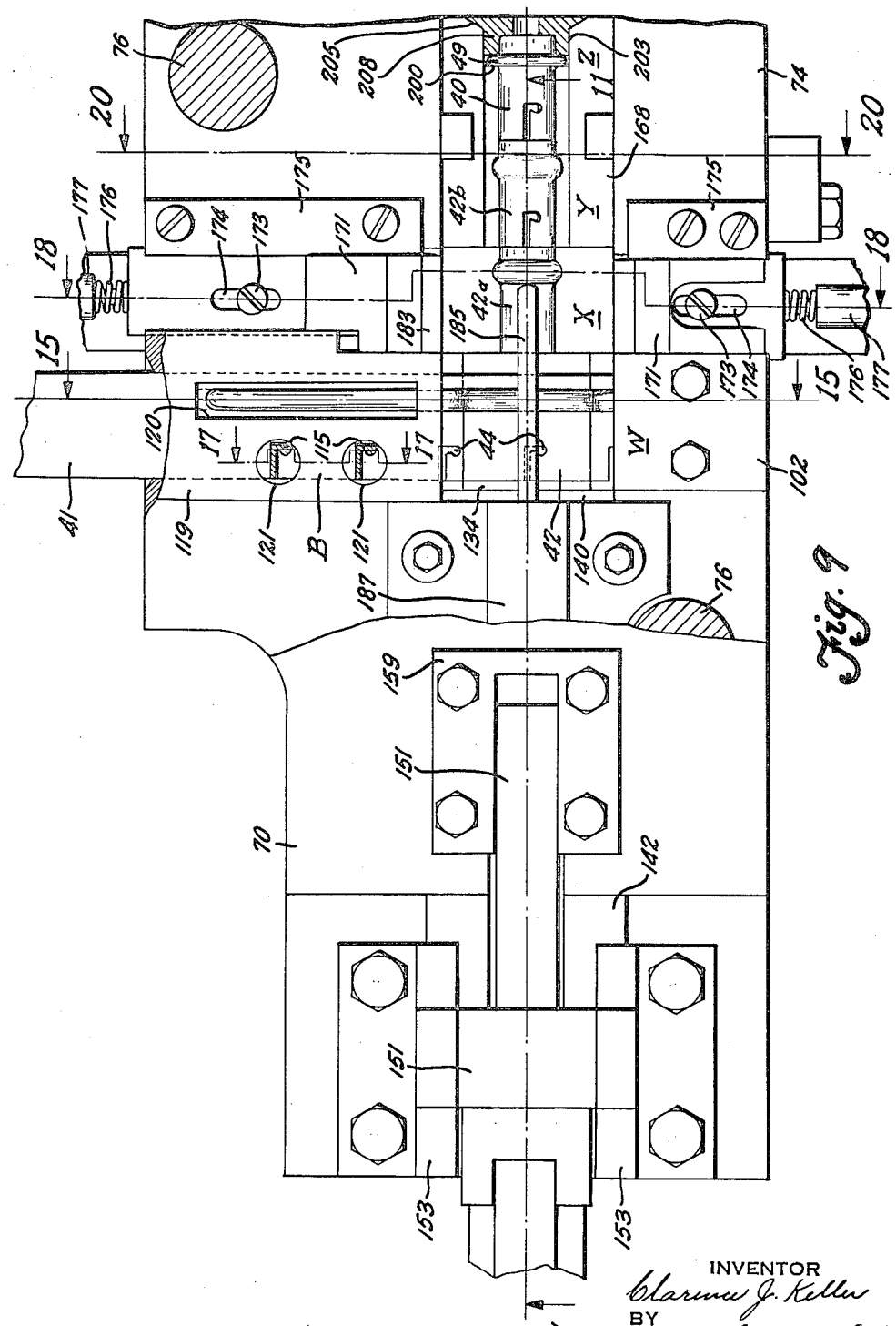

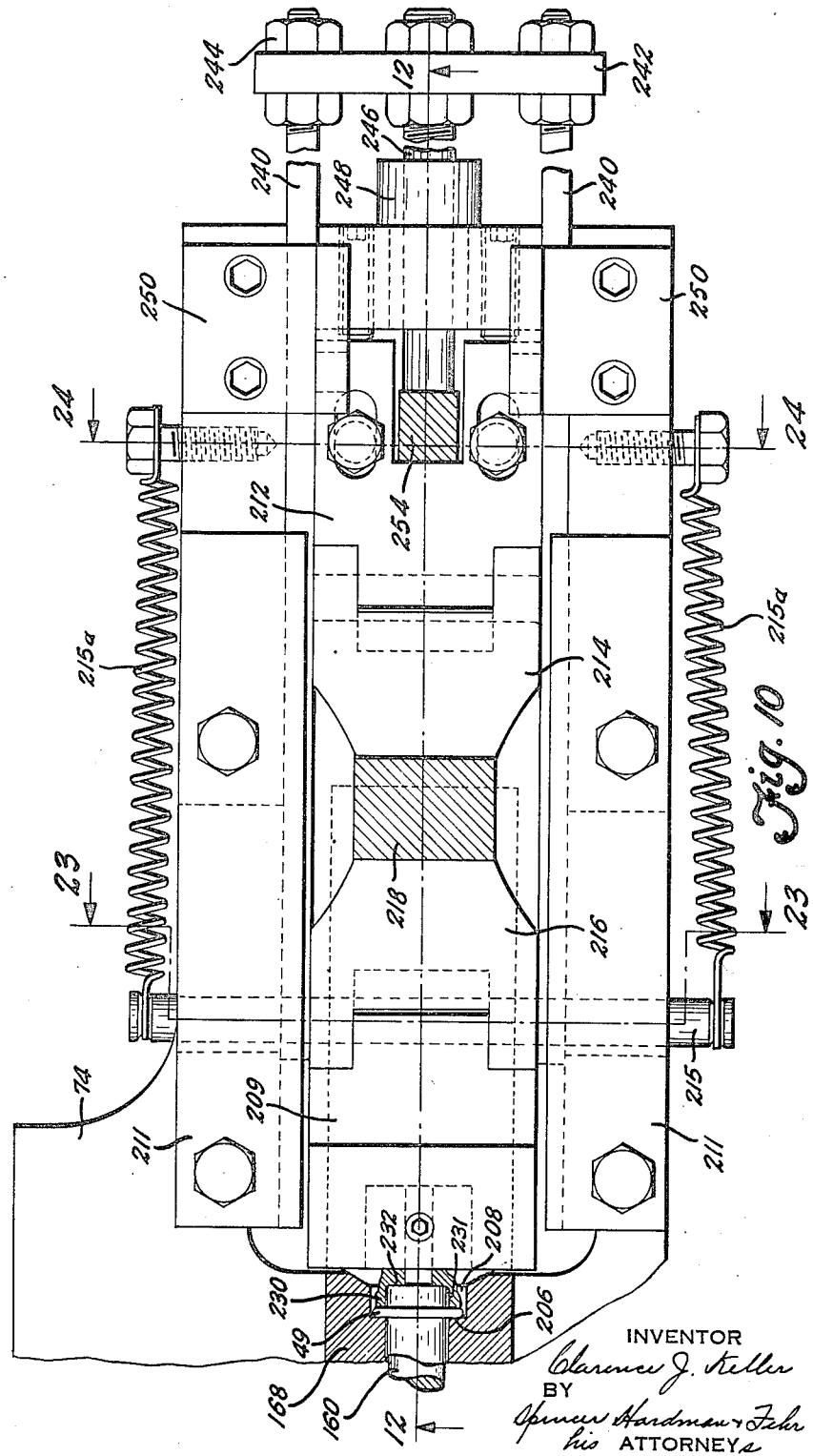

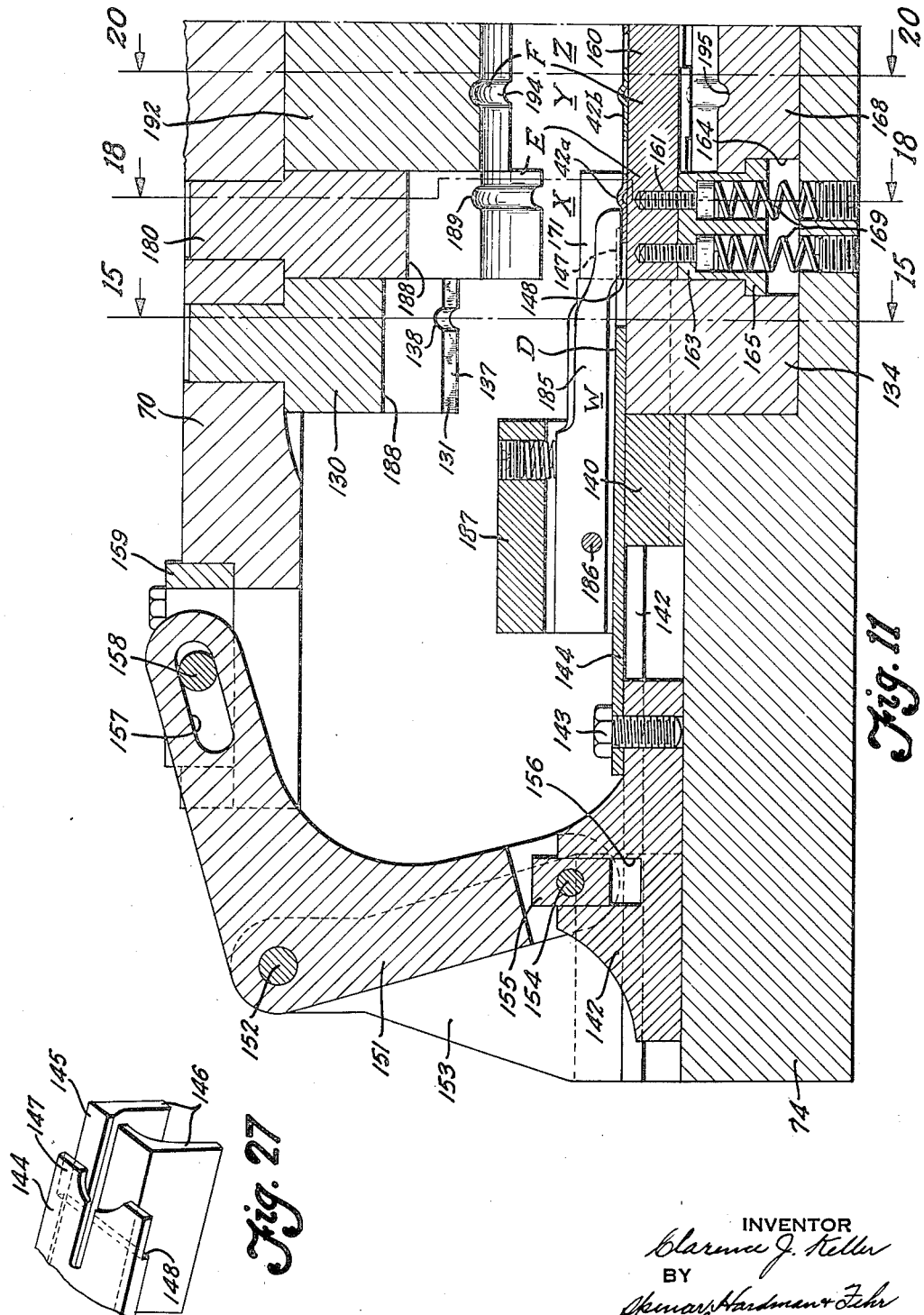

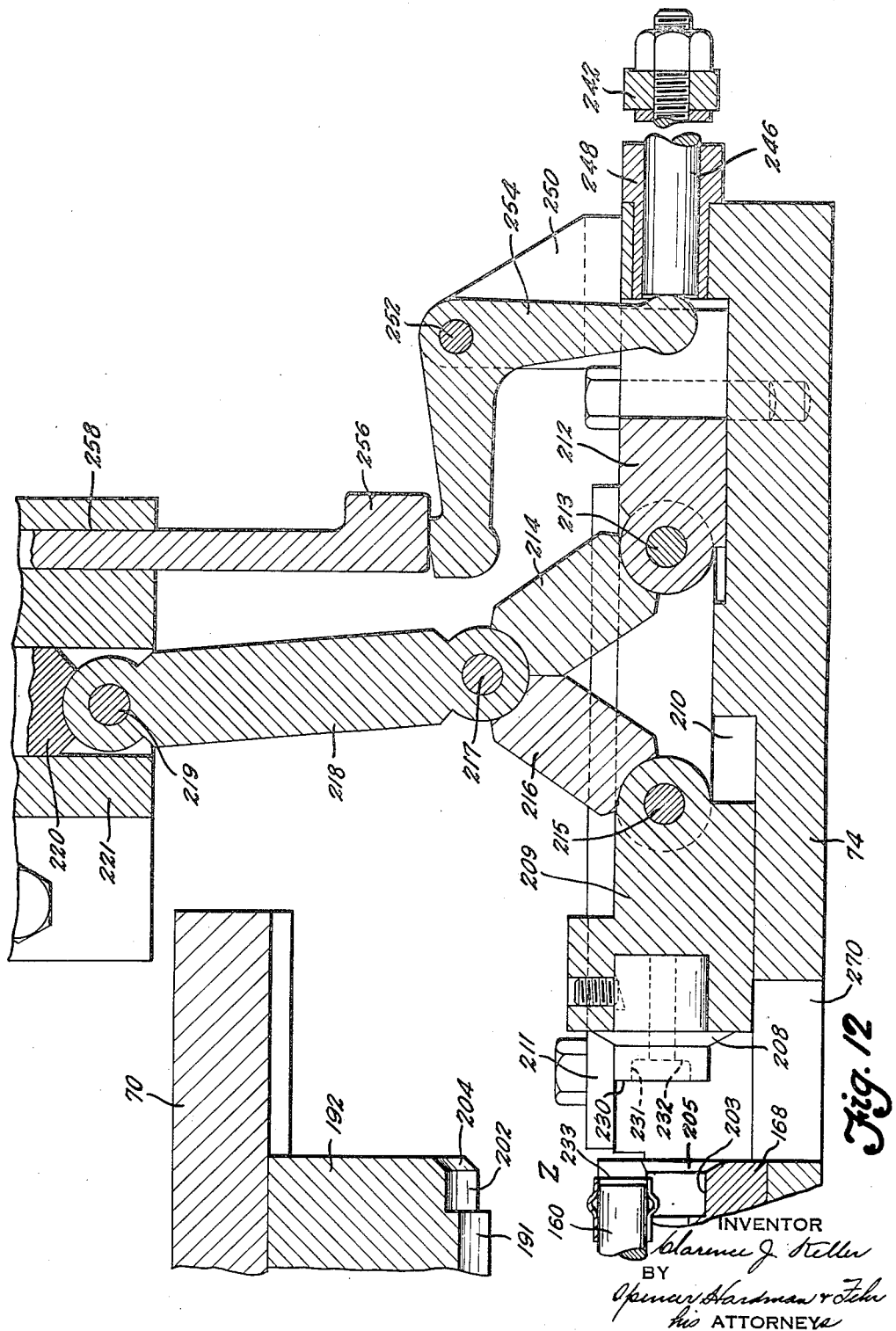

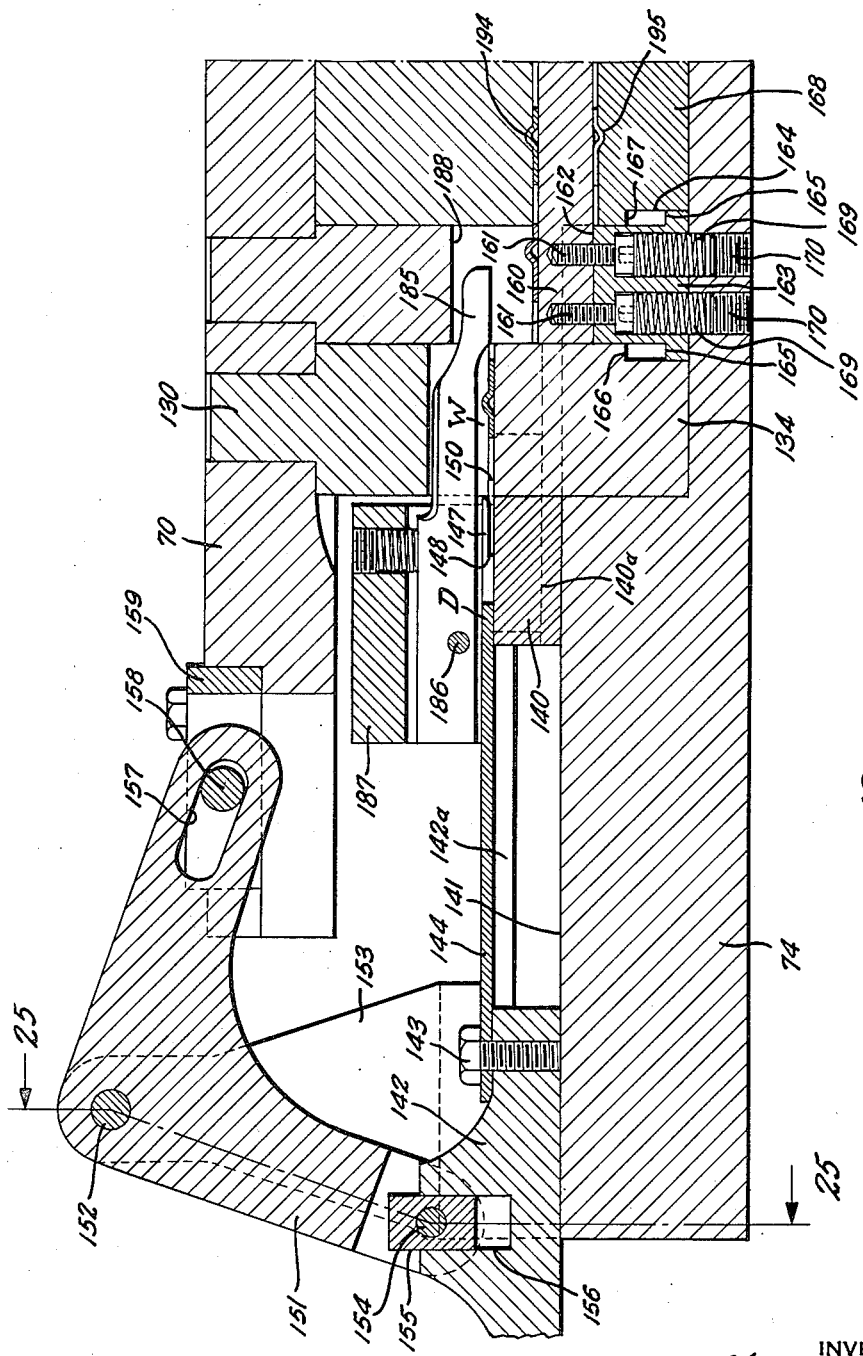

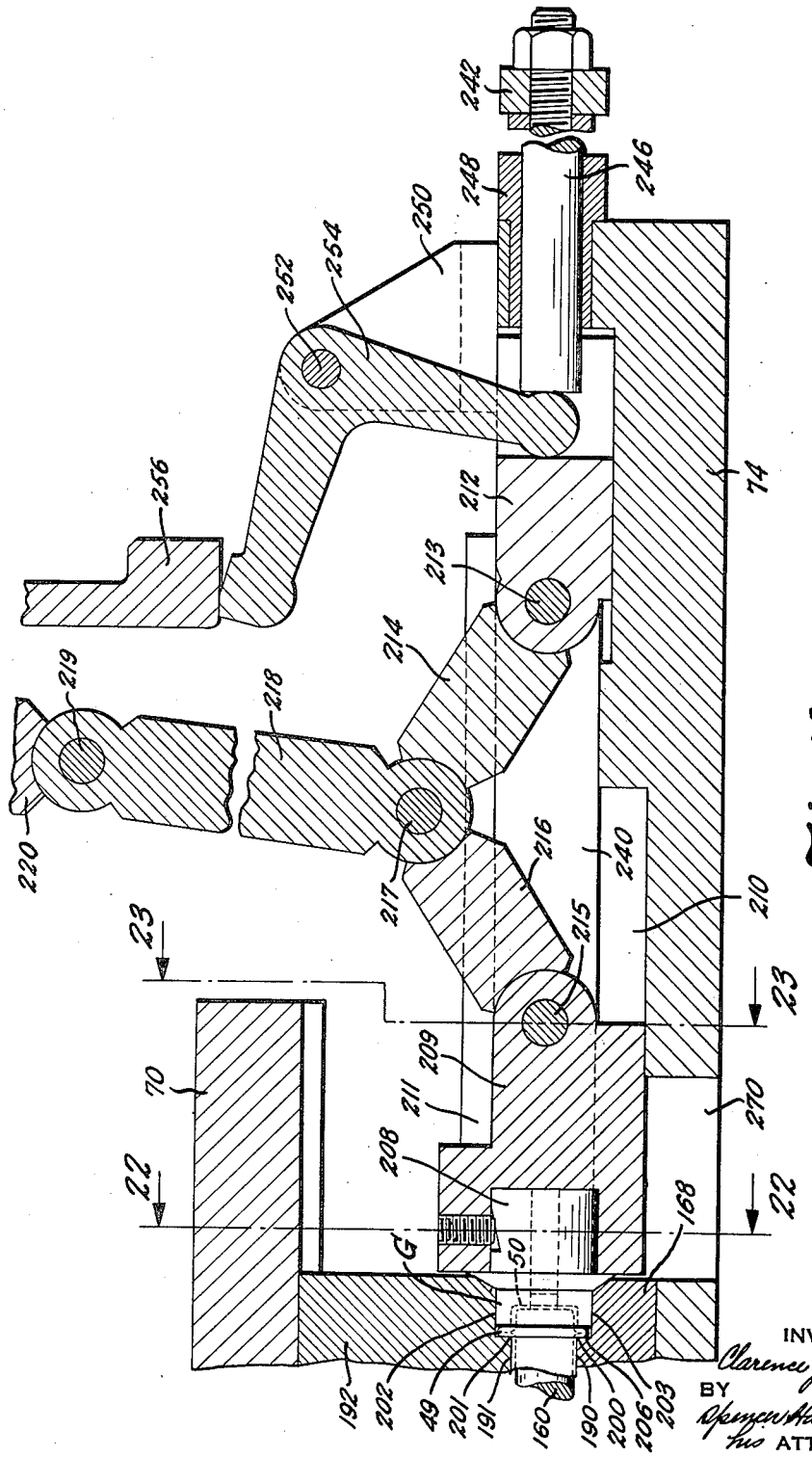

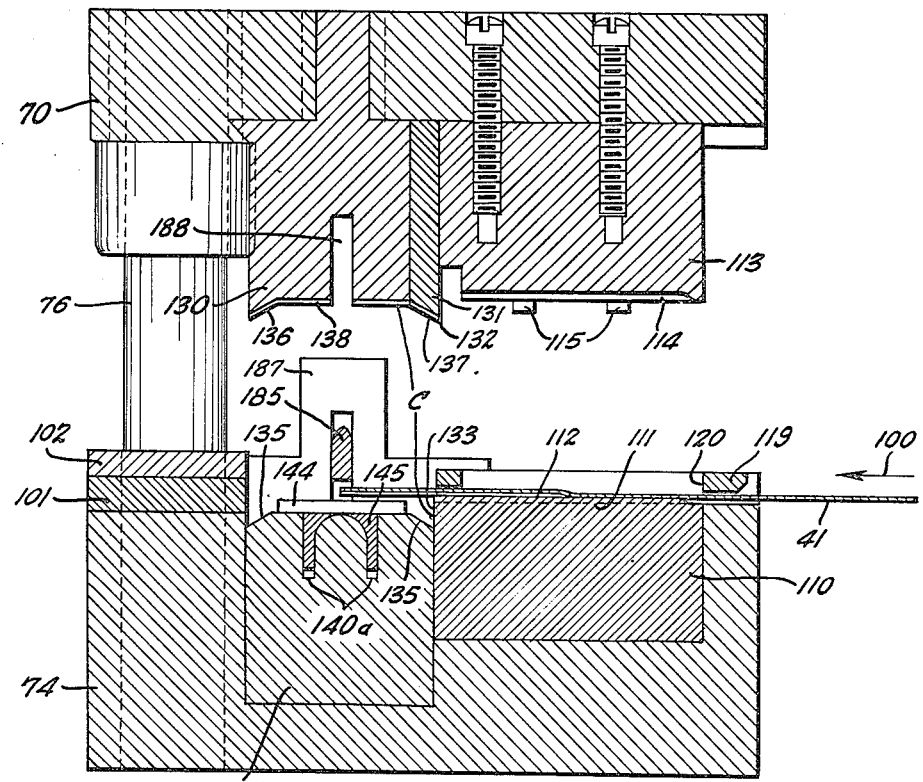
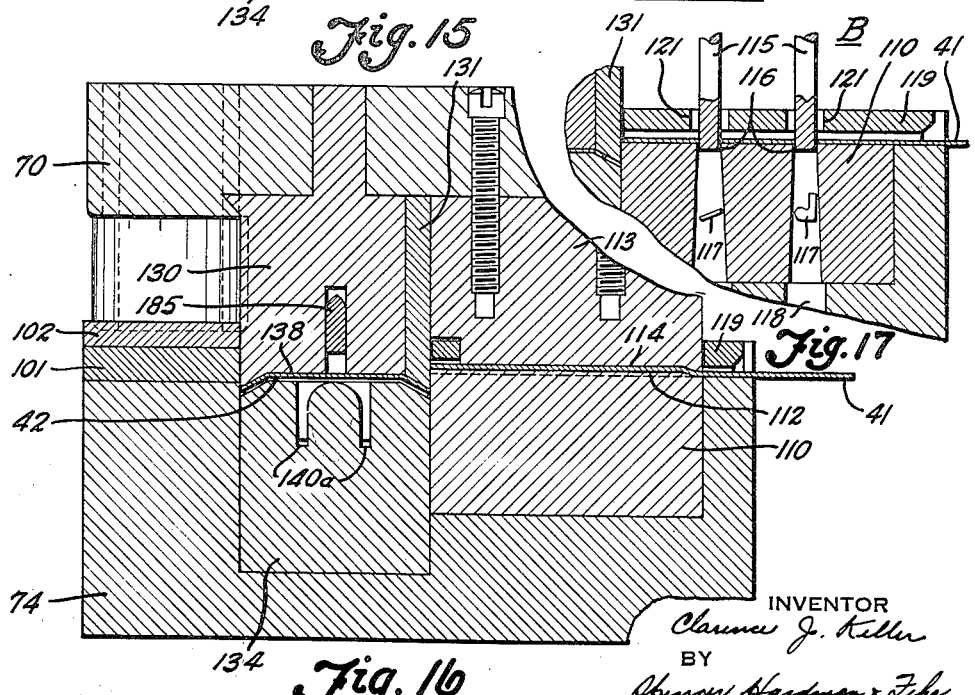
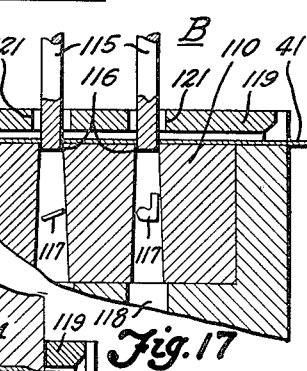

Sept. 7, 1937.  C. J. KELLER  2,092,255
APPARATUS FOR FORMING TUBULAR ARTICLES
Filed June 17, 1935   17 Sheets-Sheet 15

INVENTOR
Clarence J. Keller
BY
Spencer Hardman & Fisher
his ATTORNEYs

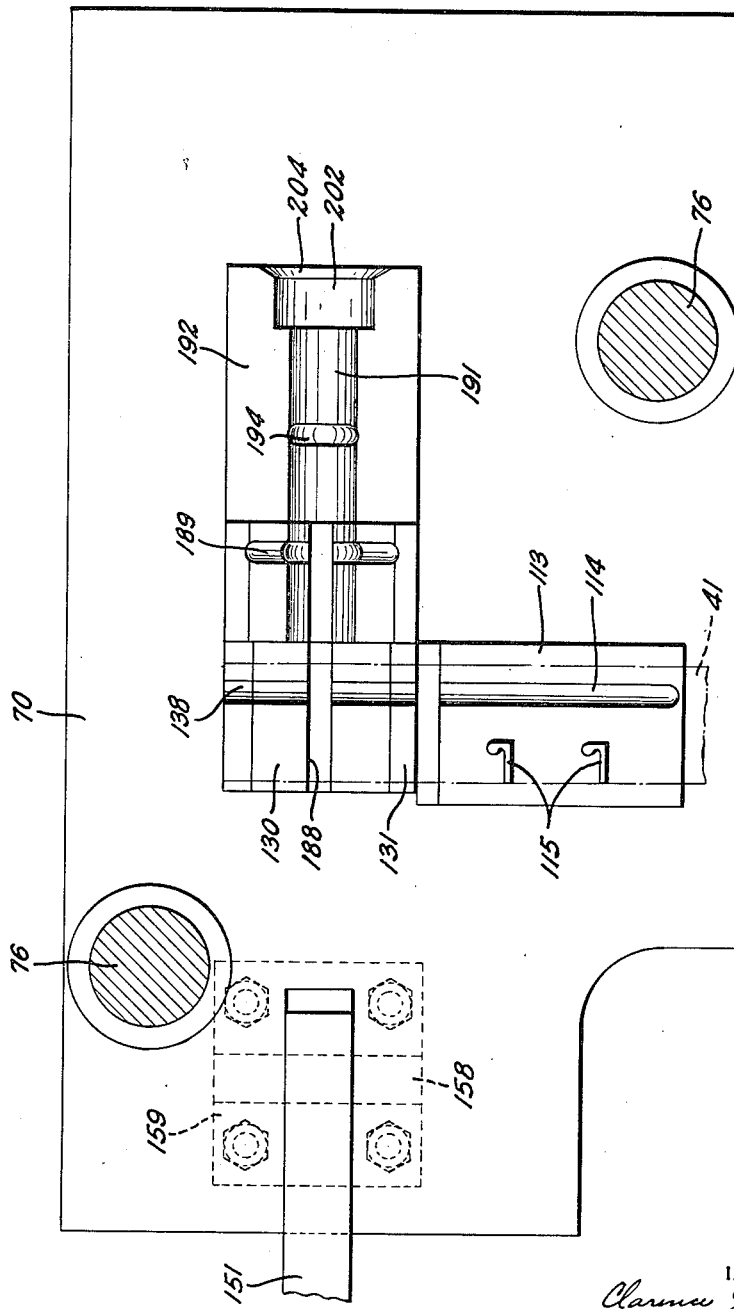

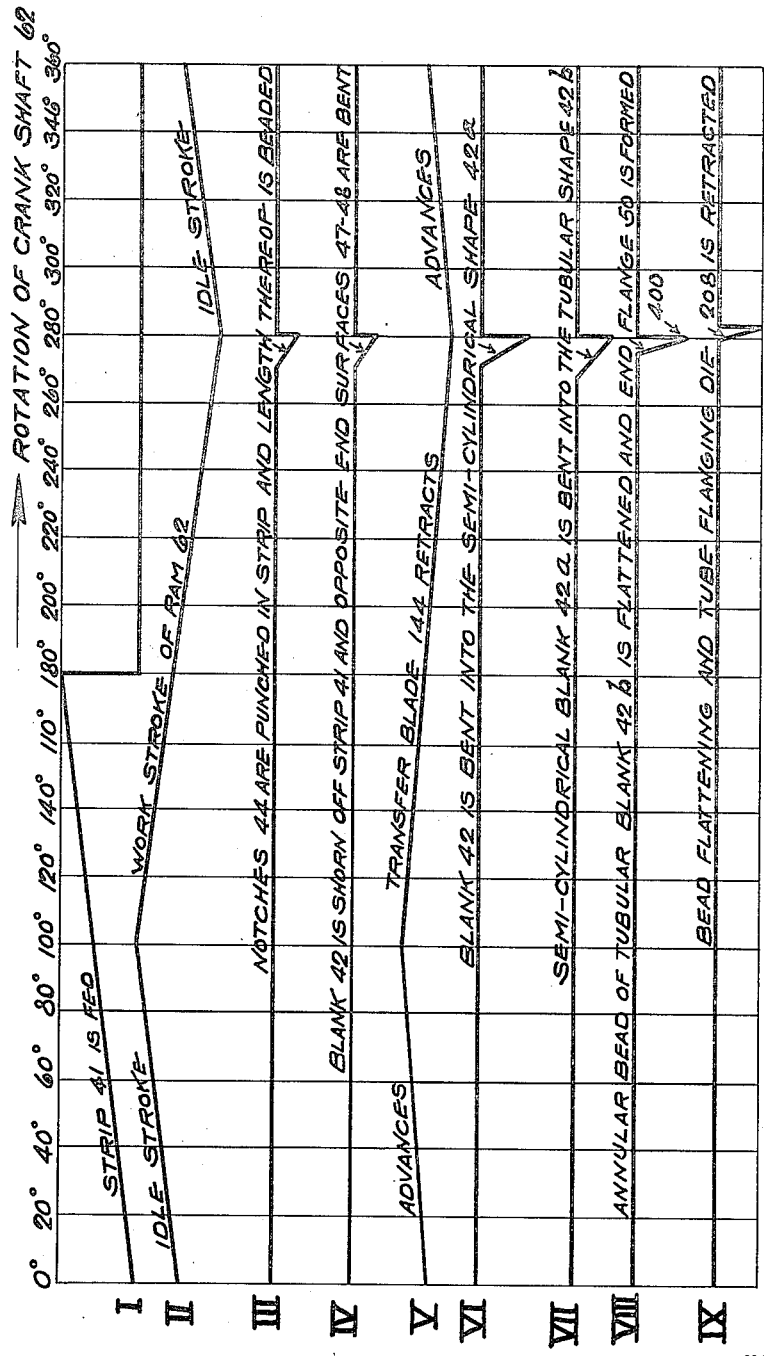

Patented Sept. 7, 1937

2,092,255

UNITED STATES PATENT OFFICE 2,092,255

APPARATUS FOR FORMING TUBULAR ARTICLES

Clarence J. Keller, Anderson, Ind., assignor to General Motors Corporation, Detroit, Mich., a corporation of Delaware Application June 17, 1935, Serial No. 26,902

6 Claims. (Cl. 153—2)

This invention relates to the manufacture of tubular articles and more particularly to an apparatus for forming tubular articles such as automotive lamp sockets from a continuous strip of sheet material.

It is an object of the present invention to form tubular articles through progressive stages from a continuous strip of sheet material.

It is another object of the present invention to provide a tubular article with a bayonet slot.

It is another object of the present invention to provide a tubular article with an annular shoulder intermediate its ends.

It is another object of the present invention to provide a tubular article with a laterally extending end flange.

Further objects and advantages of the present invention will be apparent from the following description, reference being had to the accompanying drawings wherein a preferred embodiment of the present invention is clearly shown.

In the drawings:

Fig. 3 is another fragmentary perspective view of the machine as viewed in the direction of arrow 3 in Fig. 2.

Fig. 6 discloses the material feeding device of the machine.

Fig. 7 is an enlarged section taken on the line 7—7 of Fig. 6 and showing the cooperation between the two feed rolls of the feeding device.

Fig. 8 is a side elevation of part of the feeding device and its operating elements, and is viewed in the direction of arrow 8 in Fig. 6.

Figs. 9 and 10 together form a plan view of the lower die plate and the structure mounted thereon.

Figs. 11 and 12 together constitute a cross-sectional view of the upper and lower die plates with the structure mounted thereon in inoperative position. The sections are taken on the lines 11—11 and 12—12 of Figs. 9 and 10, respectively.

Figs. 13 and 14 together constitute a cross-sectional view similar to Figs. 11 and 12, showing however, the structure on both die plates in cooperation with each other.

Fig. 15 is a transverse section taken on the line 15—15 of Figs. 9 and 11.

Fig. 16 is a transverse section along the same line 15—15 of Fig. 11, showing, however, the upper die plate and its structure in operative position.

Fig. 17 is a fragmentary sectional view taken substantially on the line 17—17 of Fig. 9.

Figure 18:
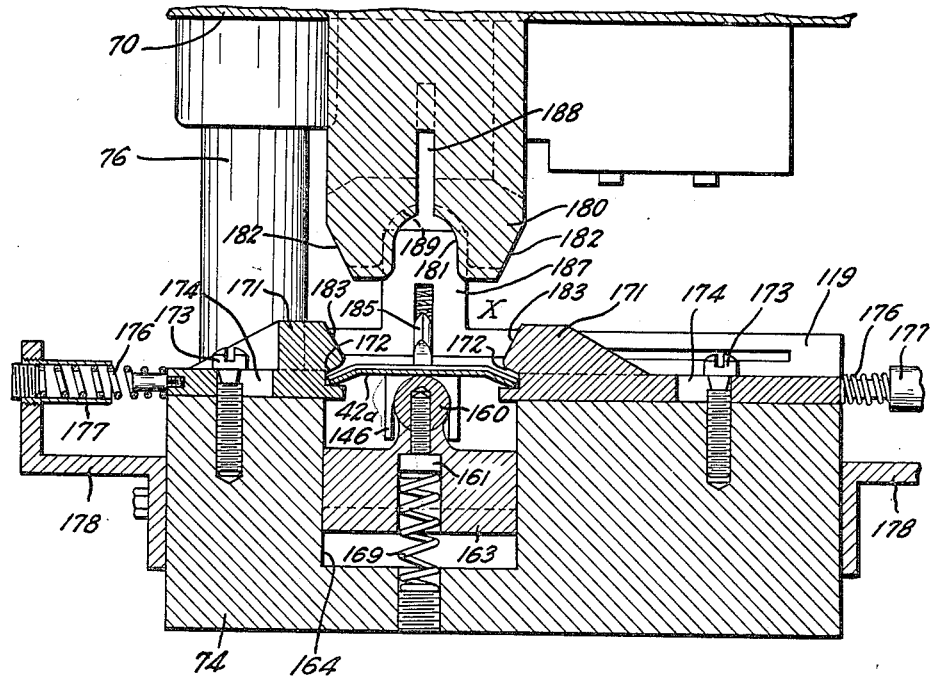

Fig. 18 is a transverse section taken on the line 18—18 of Figs. 9 and 11.

Figure 19:
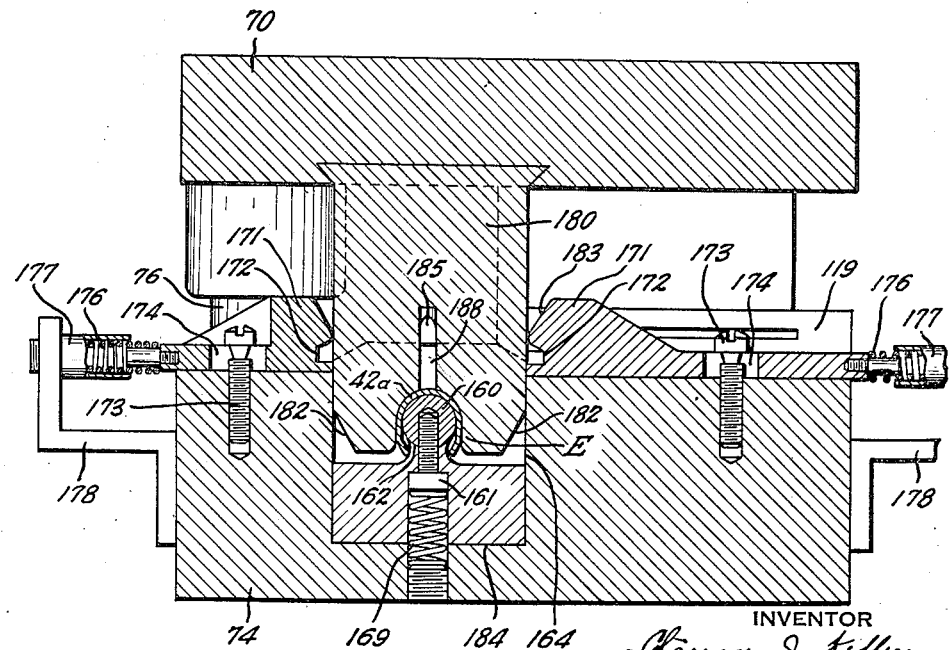

Fig. 19 is a section taken on the same line 18—18 of Fig. 11, showing, however, the structure on the upper die plate in operative position.

Figure 20:
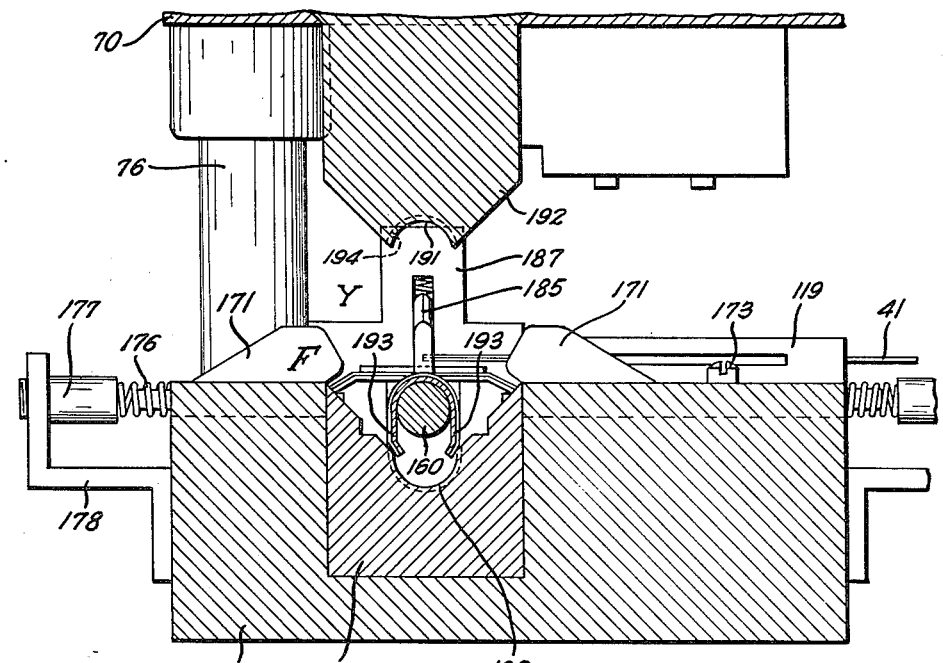

Fig. 20 is a transverse section taken on the line 20—20 of Figs. 9 and 11.

Figure 21:
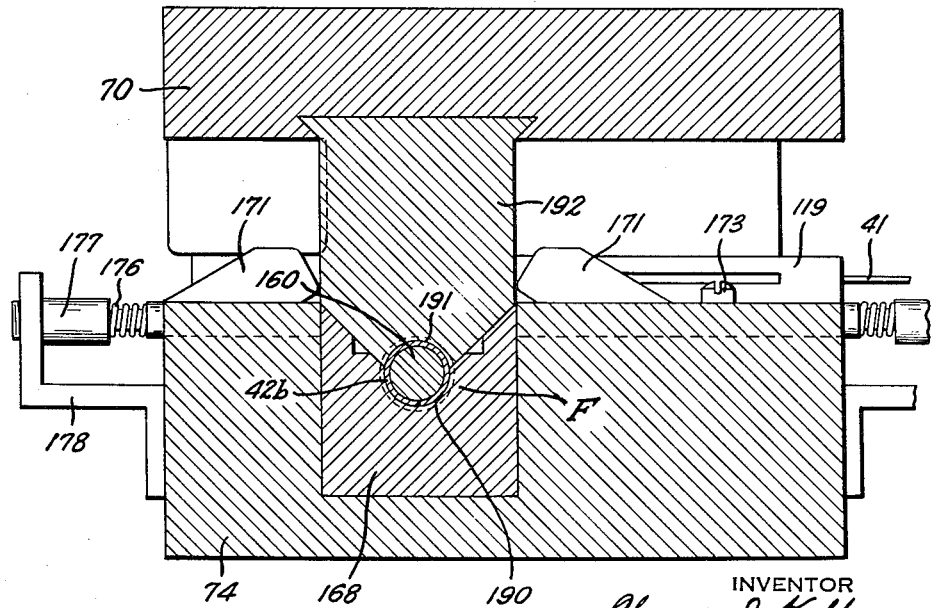

Fig. 21 is a section taken on the same line 20—20 of Fig. 11, showing, however, the structure on the upper die plate in operative position.

Figure 22:
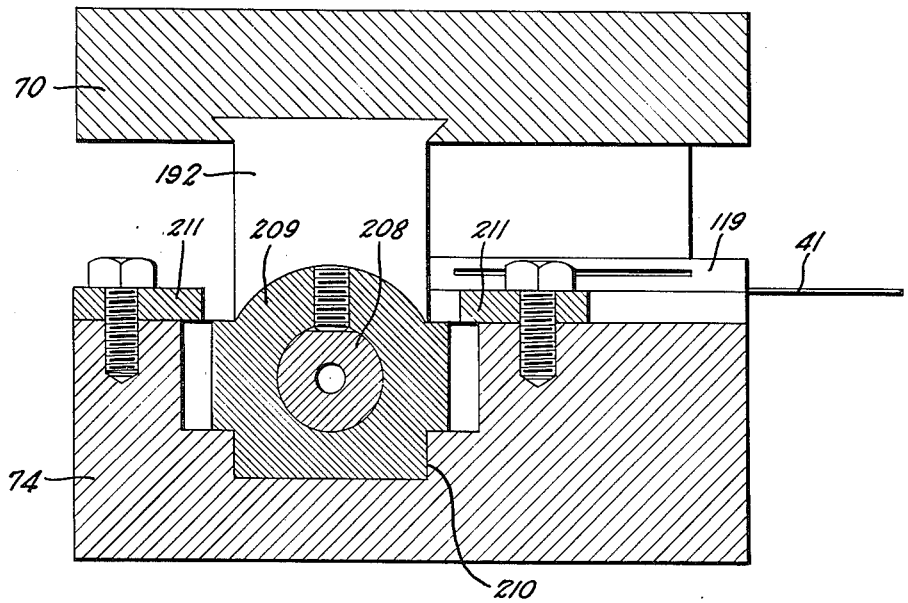

Fig. 22 is a transverse section taken on the line 22—22 of Fig. 14.

Figure 23:
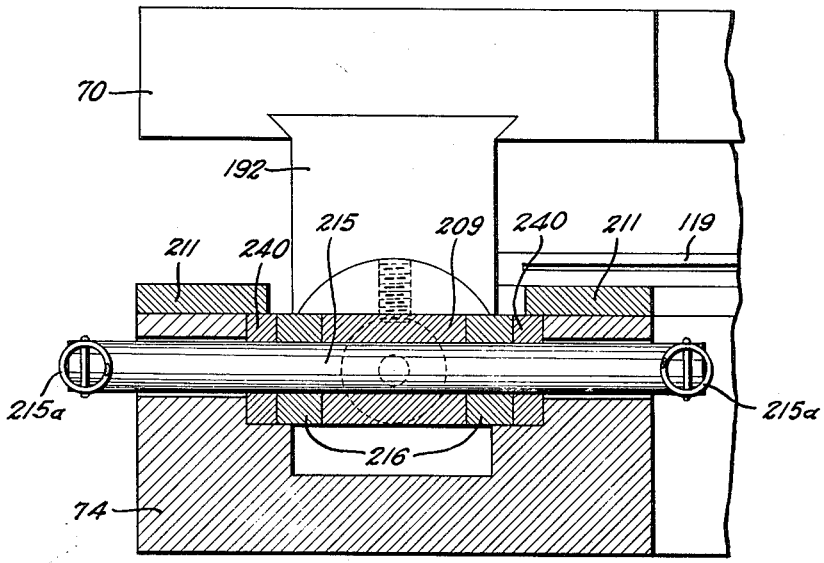

Fig. 23 is a transverse section taken on the line 23—23 of Figs. 10 and 14.

Figure 24:
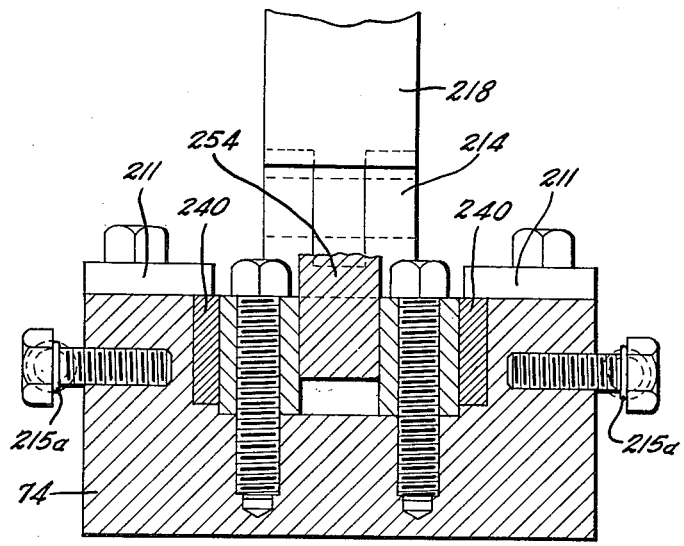

Fig. 24 is a transverse section taken on the line 24—24 of Fig. 10.

Figure 25:
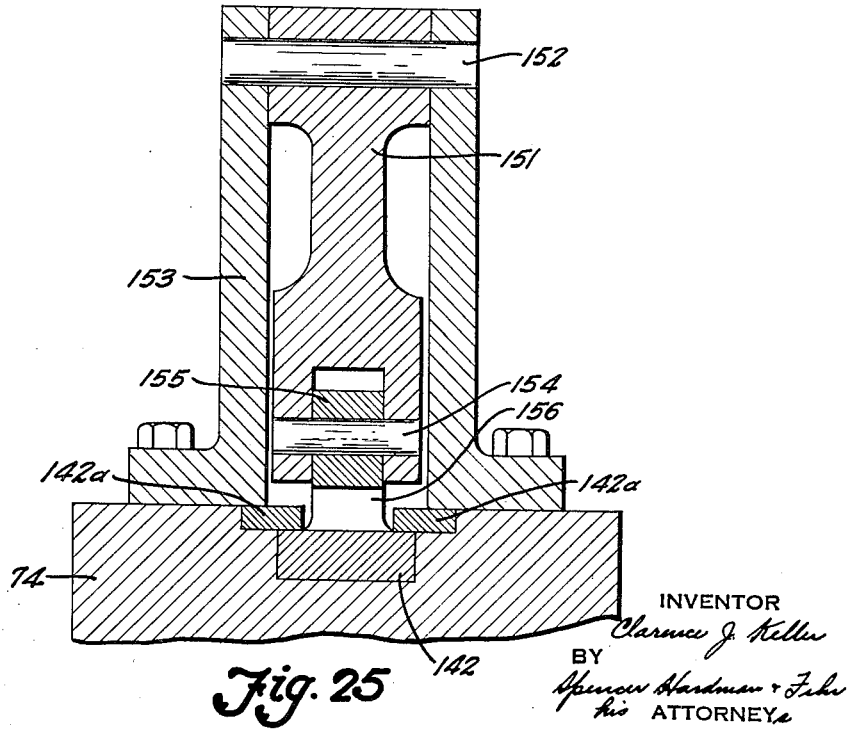

Fig. 25 is a fragmentary transverse section taken on the line 25—25 of Fig. 13.

Fig. 26 is a bottom view of the upper die plate and the structure mounted thereon.

Fig. 27 is a fragmentary perspective view of a detail of the machine.

Figs. 28 and 29 are detail views of cams mounted on the crank shaft of the machine.

Figure 1:
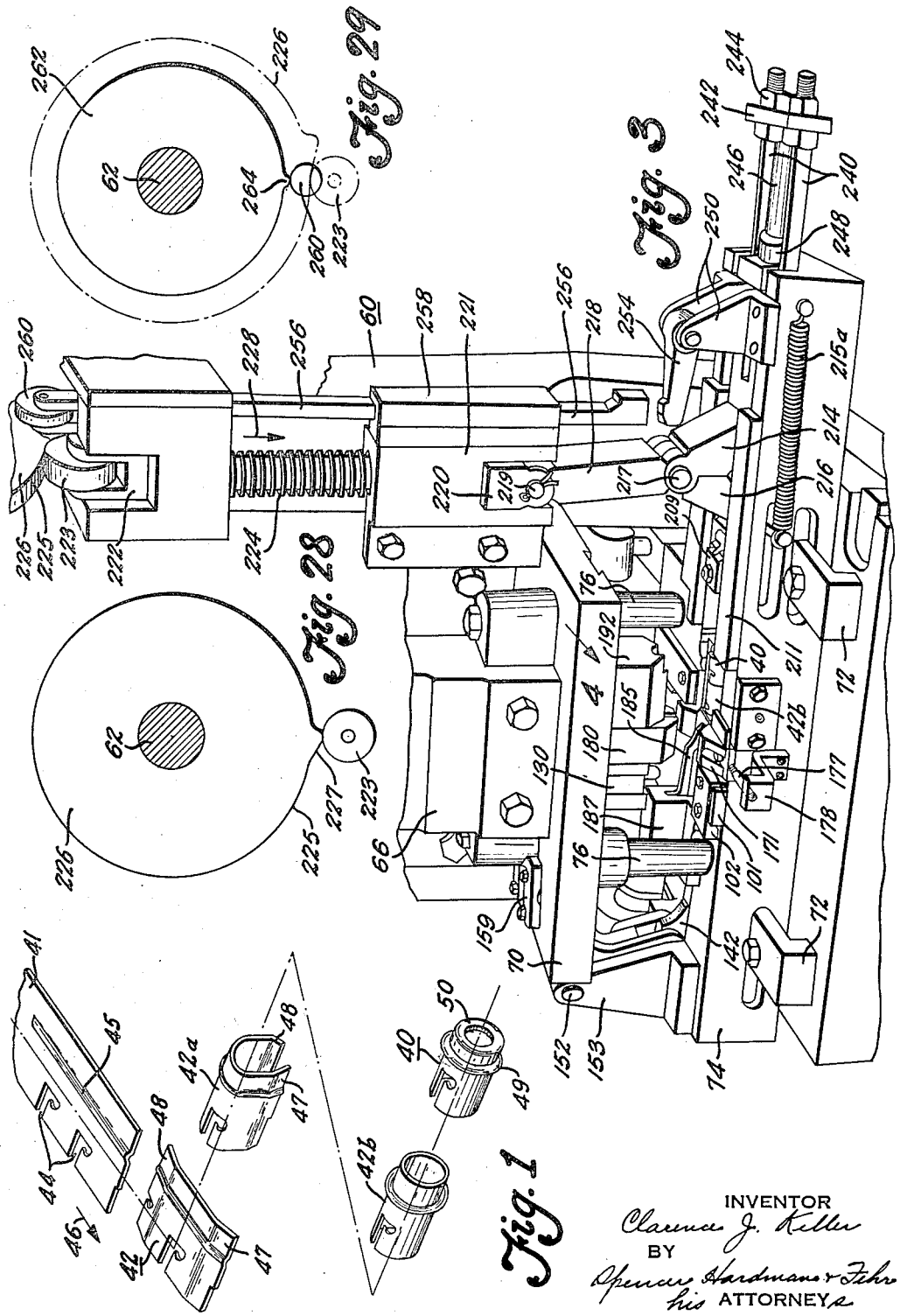
Fig. 1 illustrates progressive steps of the method pursued by the present apparatus for forming tubular articles from a strip of sheet material.
Figure 2:
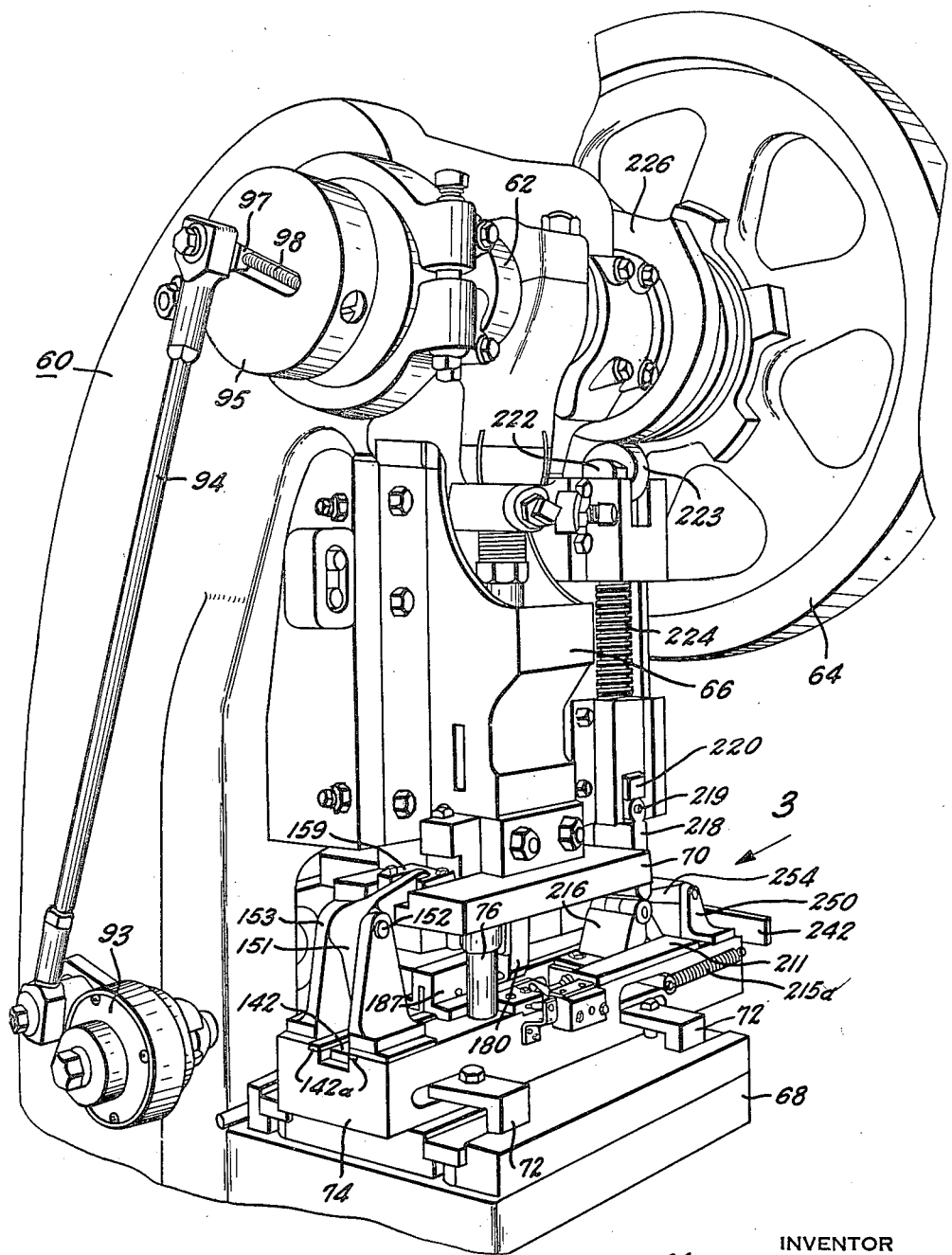
Fig. 2 is a fragmentary perspective view of a machine pursuing the method illustrated in Fig. 1.
Figure 4:
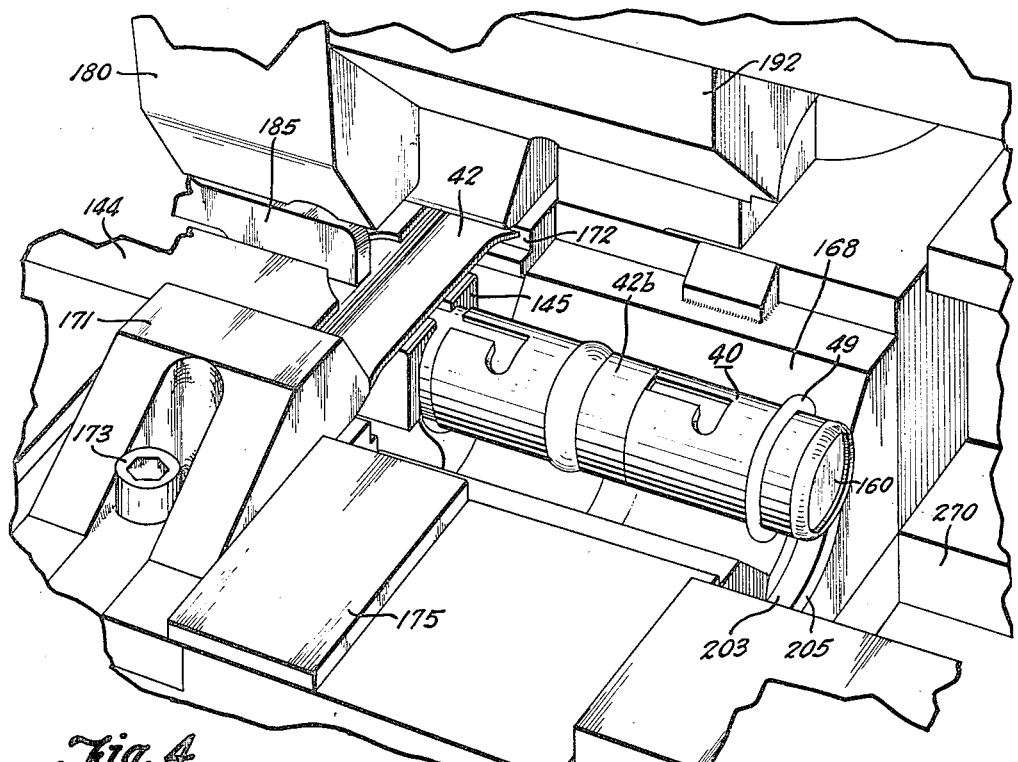
Fig. 4 is an enlarged, fragmentary perspective view of part of the machine as pointed at by the arrow 4 in Fig. 3.

Fig. 30 is a chart, graphically illustrating the timed relationship which exists between the operation of various devices of the machine, all of which contribute toward the progressive formation of a tubular article as illustrated in Fig. 1.

Referring to the drawings and particularly to Fig. 1, the present machine forms tubular articles such as the lamp socket 40 from a supply strip 41 of sheet material in a manner to be described presently. Prior to the severance of a blank 42 from the supply material, the latter is provided with two bayonet slots 44 by a single punching operation. Simultaneously with the punching of the bayonet slots, a longitudinal bead 45 is formed in the supply material. The supply material 41, after having been punched and beaded in the just explained manner, is fed in the direction of arrow 46 in Fig. 1 into cooperative relation with a blank severing device. The two opposite ends 47 and 48 of a severed blank 42 are then bent slightly out of the main plane of said blank and the latter is then transferred at right angles to the direction of feed of the supply material. Such transfer is sufficiently interrupted to perform the following operations upon a blank: the blank 42 is first bent into the semi-cylindrical shape indicated 42a and thereafter into the tubular shape indicated 42b. Next the annular bead of the tubular blank 42b is flattened to form an annular shoulder 49 and an end portion of the tubular blank is finally crimped inwardly so as to provide an end flange 50. After all these operations have been performed, the finished socket is removed from the machine.

The present machine incorporates a conventional punch press frame 60, supporting a crank shaft 62, a clutch wheel 64, a one revolution clutch (not shown) which connects the power driven clutch wheel 64 with the crank shaft and is operated by mechanism to be described later, a ram 66 and a bolster plate 68. Attached in any suitable manner to the ram 66 is an upper die plate 70, and secured in any suitable manner to the bolster plate 68, for instance by angles 72, is a lower die plate 74. A plurality of pilots 76 on the upper die plate 70 are received by corresponding sockets in the lower die plate 74. Both die plates carry cooperating elements of devices which simultaneously perform the earlier explained operations, resulting in the transfiguration of a severed blank into the finished lamp socket 40 (see Fig. 1). These devices are a material feeding device A, a punching and beading device B, a shearing and pre-bending device C, a blank transfer device D, a bending device E, a tube forming device F and a shoulder forming and flanging device G, all of which will be described detailedly in the just mentioned order.

Figure 5:
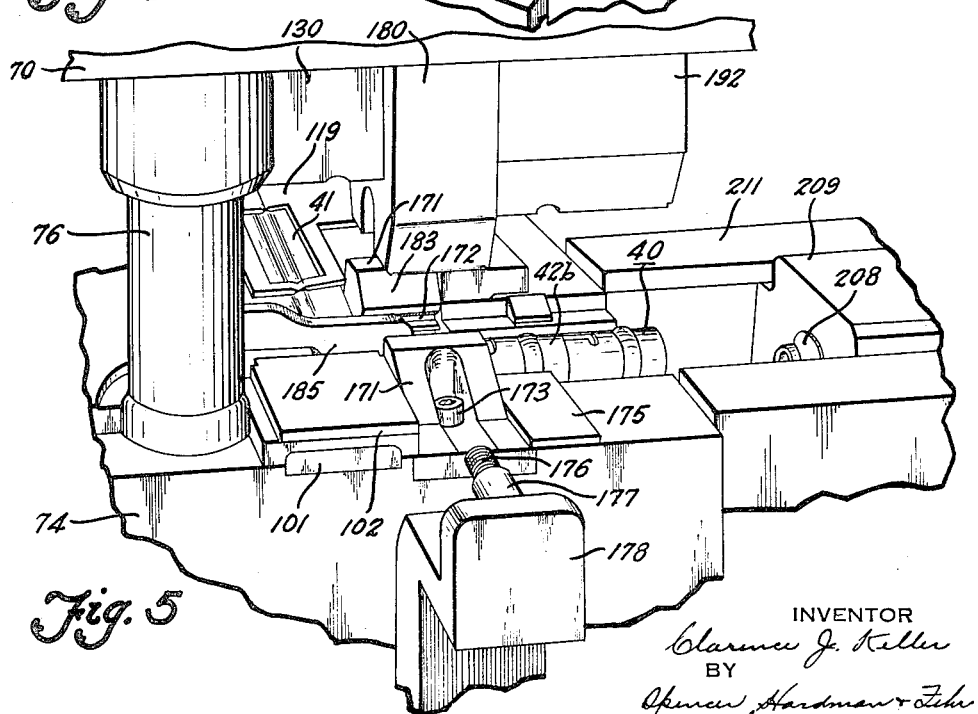
Fig. 5 is another enlarged fragmentary perspective view of substantially the same part of the machine as Fig. 4.

Attached in any suitable manner to the parallel ribs 80 of the punch press frame 60 is a bracket 81 (see Figs. 6 and 7), rotatably supporting a shaft 82 on which is mounted a feed roll 83, carrying a gear 84 which meshes with a similar gear 85 of another feed roll 86, mounted on a stubshaft 87 which is received by another bracket 88, movable vertically along guide rods 89 of bracket 81. Compression springs 90 urge bracket 88 such that the feed roll 86 thereof is in permanent, yielding engagement with feed roll 83. Attached to that end of shaft 82 which extends beyond one of the frame ribs 80 is an indexing device 93 of any suitable construction, preferably of the overrunning clutch type, which is actuated by a lengthwise adjustable link 94, connecting the indexing device with an eccentric 95 on the crank shaft 62. In order to adjust the amount of angular movement of the feed rolls while feeding, the throw of the eccentric 95 is adjustable within certain limits by means of a crank pin 97 which is connected with the link 94 and movable in a radial groove 96 of the eccentric. This crank pin 97 may be moved into any position within groove 96 by means of a spindle 98 which extends throughout groove 96 and is provided with a hexagonal socket 99 to which a suitable wrench may be applied. It is obvious that during onehalf of each revolution of the crank shaft 62 the feed rolls 83 and 86, the latter by intermediation of gears 84 and 85, rotate and feed the strip 41 of sheet material in the direction of arrow 100 in Fig. 15 until the foremost edge thereof strikes against a stop 101 of hardened steel which is secured to the lower die plate 74 by means of a cover plate 102 as best shown in Figs. 3, 5 and 15.

*Punching and beading device B*

As more particularly shown in Figs. 9 and 15 to 17 inclusive, the fed material 41 rests on a block 110 which is mounted in the lower die plate 74. A raised bead 112 merges into the top surface 111 of said block 110 and extends throughout the length of said block as more particularly shown in Fig. 15. Cooperating with the raised bead 112 is a sunken bead 114, provided by a block 113 which is mounted on the upper die plate 70. Secured in any suitable manner to the upper die plate are two spaced punches 115 which cooperate with vertically aligned recesses 116 of block 110 simultaneously to punch the two bayonet slots 44 in the strip 41. The recesses 116 taper outwardly as illustrated in Fig. 17 so that the punched-out slugs 117 may freely descend and pass through the bolster plate 68 through suitable openings 118 in the lower die plate 74 and aligned openings in the bolster plate. Mounted on top of the lower die plate 74 is a stripper plate 119 which has an opening 120 through which the upper beading die 113 may pass, and two apertures 121 (see particularly Figs. 9 and 17) through which the punches 115 may pass. This stripper plate 119 prevents the punched and beaded strip 41 from following the upper beading and punching dies when the same separate from their stationary companion dies on the lower die plate 74. It appears from Figs. 15 and 16 that the length of the beading dies within the confines of the stripper plate 119 is greater than the width of a blank 42. Due to this greater length of the beading dies a continued bead 45 in the strip is assured after the latter has been finally advanced into engagement with the stop 101 and a subsequent operation of the beading dies lengthens the previous bead without interruption. That the beading dies form a continuous bead in the strip 41 is evidenced by Fig. 16 in which the bead 45 is shown continued to the point of severance of blanks from the strip. The punches 115 extend beyond the upper beading die 113 sufficiently to assure that the strip 41 has been notched when the beading dies have completed their operation.

*Shearing and pre-bending device C*

Referring more particularly to Figs. 9, 11, 15 and 16, the upper die plate 70 carries a block 130 to which is secured a shear plate 131, the edge 132 of which is adapted to cooperate with a shearing edge 133 of the lower beading die 110 in order to shear a blank 42 from the beaded and punched supply strip 41. The lower die plate 74 carries a block 134 having opposite beveled ends 135 which are adapted to cooperate with correspondingly beveled surfaces 136 and 137 of block 130 and shear plate 131, respectively. These cooperating beveled surfaces are adapted to bend two opposite end portions of a severed blank into the shape shown in cross-section in Fig. 16. Block 130 and shear plate 131 are provided with a transverse groove 138 to provide clearance for the bead 45 while the blank 42 is bent into the shape shown in Fig. 16. It appears clearly from Fig. 15 that the material 41 is fed considerably above the top of the lower bending block 134 so that upon descent of the upper die plate 70 into the position shown in Fig. 16, that length of the material which extends from the stop 101 to the shearing edge 133 (length of a blank) is first shorn off the remaining supply material and only after descent of the severed blank 42 upon the top of the lower bending block 134 does the bending operation take place as can be readily understood.

*Blank transfer device D*

Referring more particularly to Figs. 2, 9, 11, 13, 25 and 27, the lower die plate 74 carries a block 140, providing a guide-way 140a which is continued into the lower bending block 134 as shown in Fig. 15. The lower die plate 74 also provides a track 141 in which a cross-head 142 is slidable and is retained therein by means of suitable plates 142a. Secured to cross-head 142 by a screw 143 is a transfer blade 144 the forward end of which is provided with a slide 145 (see particularly Figs. 15 and 27), which rides in the guide-way 140a. Slide 145 preferably consists of two identical members 146 which are in any suitable manner secured to the transfer blade 144. As best shown in Figs. 13 and 27, the forward end of the transfer blade 144 is provided with a tongue 147 and a shoulder 148 which is adapted to engage the adjacent edge 150 of a severed and pre-bent blank while the tongue 147 is adapted to overlap the blank as more particularly shown in Fig. 11. Reciprocation of cross-head 142 and of the attached transfer blade 144 is accomplished by means of a bell-crank lever 151 which is pivotally mounted at 152 to spaced brackets 153 on the lower die plate 74. One arm of lever 151 pivotally receives at 154 a rectangular member 155 which is slidable vertically in a rectangular groove 156 of cross-head 142, thus establishing a floating, pivotal connection between lever 151 and cross-head 142. The other arm of lever 151 is provided with an oblong slot 157 through which extends a pin 158, carried by a steel yoke 159 of the upper die plate 70. Hence, descent or ascent of the upper die plate 70 results in retraction and advancement of the transfer blade 144 into and from station W where a blank 42 is severed from the supply material and subsequently bent into the cross-sectional shape shown in Fig. 16.

As appears more clearly from Figs. 11, 13, 18 and 19, a cylindrical arbor 160 is secured by screws 161 to a correspondingly curved surface 162 of a supporting block 163 which is vertically slidable in a suitable recess 164 of the lower die plate 74. This supporting block 163 is provided with two opposite shoulders 165 which are normally urged into engagement with shoulders 166 and 167, provided by the lower bending block 134 and a die block 168, respectively, by means of compression springs 169. When the shoulders 165 of the supporting block 163 are in engagement with their respective shoulders 166 and 167, the periphery of the arbor is flush with the top surface of bending block 134 on which a severed, pre-bent blank rests. It may be stated in advance that the arbor assumes the just mentioned position relative to the lower bending block 134 when the transfer blade 144 advances a severed and pre-bent blank from station W to station X, so that a thus advanced blank actually slides on the periphery of the arbor into station X as more particularly shown in Figs. 11 and 18. In order to prevent a blank from sliding off the arbor 160 at station X, blank retainers 171 are slidable linearly to and from such a blank on top of the lower die plate 74. These retainers are provided with opposite grooves 172 which receive the pre-bent end portions of the blank while the same is advanced into station X. The traveling stroke of these retainers 171 is limited by means of stop screws 173 which project through oblong slots 174 of both retainers and are received by the lower die plate 74. The retainers 171 are guided for linear movement by gib plates 175 (Fig. 9) and are normally urged into the position shown in Fig. 18 by means of compression springs 176, which are housed in tubular sleeves 177, carried by L-shaped brackets 178 which are secured to the lower die plate 74.

At station X the pre-bent blank is formed into the semi-cylindrical shape 42a as illustrated in Fig. 1. For that purpose the upper die plate 70 carries a bending block 180 having a semi-cylindrical bending surface 181, adapted to cooperate with the arbor 160 in bending a blank at station X half-way around said arbor. This bending block 180 is provided with oppositely tapered surfaces 182 which during descent of the upper die plate 70 from the position shown in Fig. 18 cooperate with correspondingly tapered surfaces 183 of the retainers 171 and force the latter away from the blank such that at the time block 180 contacts the blank, the retainers 171 have cleared the pre-bent ends thereof. Upon continued descent of block 180 the arbor 160 is depressed against the compression of springs 169 until the supporting member 163 comes to rest on the bottom surface 184 of recess 164 as shown in Fig. 19, and only thereafter proceeds the semi-cylindrical surface 181 of block 180 to bend the blank half-way around the arbor as shown in Fig. 19. Upon the following ascent of the upper die plate 70, arbor 160 follows block 180 into the uppermost position shown in Fig. 11. In order to prevent the semi-cylindrical blank 42a from following the further ascending block 180 after the arbor 160 has reached the limit of its ascent as shown in Fig. 11, a spring urged retainer bar 185 is pivotally mounted at 186 to a bracket 187 which is in turn mounted on the lower die plate 74.

In order to avoid interference between the retainer bar 185 and blocks 130 and 180 of the upper die plate 70, both blocks are provided with aligned grooves 188 which clear the retainer bar 185 under all circumstances. In order to prevent any disfiguration of the bead during the bending of the blank into semi-cylindrical shape, the bending surface 181 of block 180 is provided with a groove 189 which entirely clears the bead when said bending surface forces the blank halfway around the arbor.

It is clear from the earlier description of the movement of the transfer blade 144 in response to movement of the upper die plate that said transfer blade never interferes with the movement of blocks 130 and 180 of the upper die plate.

*Tube forming device F*

Referring more particularly to Figs. 9, 11, 13, 20 and 21, a semi-cylindrical blank 42a is advanced on the arbor 160 into station Y by a severed and pre-bent blank while being transferred from station W to station X by the transfer blade 144. Such transfer and advancement, respectively, of the blanks takes place during the latter part of the ascent of the arbor into the position shown in Fig. 11 as can be readily understood. As best shown in Fig. 20, block 168 comprises a semi-cylindrical die surface 190, the complementary die surface 191 to which is provided by a block 192 on the upper die plate 70. Upon descent of the upper die plate 70 from the position shown in Fig. 20 to that shown in Fig. 21, the die surface 191 engages the semi-cylindrical portion of the blank 42a at station Y and thereafter depresses the arbor from the position shown in Fig. 11 to that shown in Figs. 13 and 21. During such descent of the arbor, the parallel leg portions 193 of the semi-cylindrical blank 42a, are bent completely around the arbor by the lower die surface 190 as best shown in Fig. 21. The upper and lower die surfaces 191, 190 are provided with grooves 194 and 195, respectively, which completely clear the bead of the tube 42b during its formation from the semi-cylindrical shape 42a into tubular shape. It is apparent from the preceding description that the upper die surface 191 not only assists in forming a semi-cylindrical blank into tubular shape but serves also as a blank retainer while the parallel leg portions 193 are bent into engagement with the cylindrical arbor 160. Upon ascent of the upper die plate 70 from the position shown in Fig. 21 to that shown in Fig. 20, the arbor together with the formed tube 42b follow the ascending block 192 until the arbor reaches the topmost position shown in Figs. 11 and 20.

*Shoulder forming and flange crimping device G*

Referring more particularly to Figs. 4, and 9 to 14, a tube 42b at station Y is advanced on the arbor 160 into station Z by a semi-cylindrical blank 42a while advanced on the arbor from station X to station Y by a severed and pre-bent blank which in turn is transferred from station W to station X by the transfer blade 144 as has been earlier explained. It appears particularly from Figs. 11 to 14, inclusive, that the lower block 168 extends from station Y to station Z and that the semi-cylindrical die surface 190 thereof extends to the point 200 in Fig. 14. It appears likewise from these figures that the upper block 192 extends also from station Y to station Z and that its cylindrical die surface 191 extends to the point 201 in Fig. 14. The upper and lower blocks 192, 168 are provided with part-annular recesses 202 and 203, respectively, which together form an annular recess when the two die members are in cooperative relation with each other as shown in Fig. 14. The part-annular recesses 202 and 203 are chamfered at 204 and 205, respectively. It appears from Figs. 11 and 12 that annular bead of a tubular blank 42a at station Z is within the confines of the part-annular recesses 202 and 203 of the upper and lower blocks 192, 168 respectively, so that upon descent of the upper die plate 70 from the position shown in Fig. 12 to that shown in Fig. 14, the bead of the tubular blank 42b abuts the bottom surface 206 of the annular recess, formed by the part-annular recesses 202 and 203, while the cylindrical die surfaces 191, 190 of the blocks 192, 168 firmly engage that portion of the tube which is to the left of the annular bead as viewed in Fig. 14. While the tube 42b at station Z is thus firmly clamped by the blocks 192, 168 against the arbor, a die 208 approaches the foremost end of the tube and flattens the bead into the annular shoulder 49 and crimps an end portion of said tube inwardly into the flange 50 as best shown in Figs. 10 and 14. The die 208 is carried by a slide 209 which is movable axially of the arbor in guide ways 210, provided by the lower die plate 74 as best shown in Fig. 22. The slide 209 is retained in the guide ways 210 by means of plates 211 on top of the lower die plate 74. Also mounted in the lower die plate 74 for adjustments axially of the arbor 160 is a member 212 which pivotally receives at 213 one end of a link 214. The slide 209 pivotally receives at 215 a link 216. The free ends of both links 214 and 216 are pivoted at 217 to an actuating link 218, pivoted at 219 to a bar 220 which is guided for vertical movement by a suitable guide 221, mounted on the punchpress frame 60 in any suitable manner. The upper end of bar 220 is provided with a fork 222 in which an anti-friction roller 223 is journaled. A compression spring 224, bearing with one end against the fixed guide 221 and with the other end against the fork 222, normally retains the anti-friction roller 223 in permanent engagement with the periphery 225 of a cam disk 226 on the crankshaft 62 of the machine. The cylindrical periphery of the cam disk 226 is interrupted by a raised lobe 227 which during each revolution of the cam-shaft cooperates once with roller 223 thereby moving bar 220 in the direction of arrow 228 (see Figs. 3 and 12) against the compression of spring 224. Such movement of bar 220 causes corresponding movement of the actuating link 218 and a collapsing of the links 214, 216 from the position shown in Fig. 12 to that shown in Fig. 14. Such collapsing of the links 214, 216 causes movement of slide 209 and die 208 from the position shown in Fig. 12 to that shown in Fig. 14, i. e. into cooperative engagement with a tube at station Z. While the die 208 thus approaches a tube 42b at station Z, a shoulder 230 of said die engages the annular bead of said tube and flattens the same against the bottom surface 206 of the annular recess, formed by the part-annular recesses 202 and 203 of the cooperating blocks 192, 168, respectively, thereby forming the annular bead into the annular shoulder 49. The die 208 is also provided with an annular recess 231 of the same diameter as the tube. The bottom surface 232 of said annular recess 231 engages the end 233 of the tube and crimps the same inwardly into the annular flange 50 at substantially the same time as the shoulder 231 of said die deforms the annular bead into the annular shoulder 49.

Before the arbor is permitted to start returning from the position shown in Fig. 14 to that shown in Fig. 12, the die 208 has to be sufficiently withdrawn from the position shown in Fig. 14 so as to clear the arbor. For that purpose, drawbars 240 are secured to the pivot 215 on opposite sides of slide 209. These draw-bars are also secured to a cross-bar 242 (see Fig. 10), which is attached at 244 to a plunger 246, slidable in a bushing 248 of the lower die plate 74. Mounted on said lower die plate are spaced bearing brackets 250 which journal at 252 a bell-crank lever 254, one arm of which is in alignment with plunger 246 and the other arm with a vertically reciprocable rod 256 which is suitably guided at 258 and carries at its upper end an anti-friction roller 260 (see Figs. 3 and 29). Cooperating with this roller 260 is a cam disc 262 on the crankshaft 62 of the machine. This cam disc 262 has a raised lobe 264 which cooperates with roller 260 and depresses rod 256 immediately after the die 208 has performed its operations on a tube at station Z and before the arbor commences to return from the position shown in Fig. 14 to that shown in Fig. 12. Such depression of rod 256 causes counter-clockwise rotation of lever 254 as viewed in Fig. 14 and consequently an enforced withdrawal of die 208 and slide 209 from the position shown in Fig. 14 through intermediation of plunger 246, cross-bar 242 and the draw-bars 240. As soon as the considerable static friction between die 208 and a just finished lamp socket has been overcome upon such enforced withdrawal of said die, tension springs 215a (see Fig. 10) complete the withdrawal of die 208 and slide 209 into inoperative position. Thereafter, the crankshaft 62 of the machine has sufficiently advanced beyond the lower dead center of its circular path as to effect retraction of the upper die plate 70 from the position shown in Figs. 13 and 14. After the arbor has returned to uppermost position (see Figs. 11 and 12) a new transfer operation by the transfer blade 144 takes place whereupon a tube 42b during its advance from station Y to station Z ejects a finished lamp socket 40 from the arbor as can be readily understood. The ejected lamp socket drops through an aperture 270 of the lower die plate 74 and through an aligned aperture of the bolster plate 68 of the machine into any suitable receptacle (not shown).

*Mode of operation*

The operation of the machine will now be described with reference to the chart shown in Fig. 30, wherein the various operations performed by the machine are shown in dependency upon one complete revolution of the crank-shaft 62. It follows from tier I of the chart that the strip of sheet material is fed in the earlier explained manner during 180° rotation of crankshaft 62. After approximately 100° rotation of the crankshaft from the start of the feeding operation, the ram 66 starts on its work stroke, which as shown in tier II is completed after 180° further rotation of the crankshaft 62. Toward the end of the work stroke of the ram various operations take place all of which are represented graphically in the chart. Tier III represents the simultaneous punching of the bayonet slots 44 into the strip 41 of sheet material and the beading of a pre-assigned length of said strip. During the latter part of the work stroke of the ram, a blank 42 is shorn off of the supply strip 41 and immediately thereafter opposite end surfaces 47, 48 thereof are slightly bent out of the main plane of the blank as represented by tier IV in the chart. Between work strokes and more particularly during the latter part of an idle stroke of the ram, the slightly bent blank 42 is advanced on the arbor into station X by transfer blade 144 in the earlier described manner as represented by tier V. It follows from this tier that the transfer blade retracts concurrently with the movement of the ram on its work stroke, and advances concurrently with the movement of the ram on its idle stroke. During part of the work stroke of the ram the blank 42 is bent into the semi-cylindrical shape 42a in the earlier explained manner as represented in tier VI of the chart. Comparison between tiers VI and VII of the chart shows that a blank 42 is bent into the semi-cylindrical shape 42a at substantially the same time as another semi-cylindrical blank 42a is formed into the tubular shape 42b in the earlier explained manner. At the very end of the work stroke of ram 62, i. e., when the die blocks on the upper die plate 70 have forced the arbor into the position shown in Figs. 13 and 14, another tubular blank 42b, is operated on by the die 208 which flattens the tube bead into an annular shoulder 48 and forms a tube end portion into an end flange 50 as has been earlier explained. The two last mentioned operations are represented in tier VIII in which the point 400 which represents the completion of the two last mentioned operations is illustrated as concurrent with the graphical representation of the completed work-stroke of the ram. Tier IX of the chart shows that before the ram 62 and upper die plate 70 noticeably retract from the lowermost position as shown in Figs. 13 and 14, the links 214, 216 are actuated in the earlier explained manner so as to free the finished lamp socket 40 on the arbor from the die 208 which, when in the position shown in Fig. 14, obstructs movement of the arbor into the position shown in Figs. 11 and 12.

It follows from the foregoing description that the machine is of the completely automatic type, and the one revolution clutch which drivingly connects the power driven clutch wheel 64 with the crank-shaft 62 is in any suitable manner forced permanently to transmit motion from the clutch-wheel 64 to the crank-shaft 62. This is preferably accomplished by an operator who keeps his foot on any conventional foot operated clutch actuating mechanism (not shown) which only upon release by the foot of the operator causes revolution of crankshaft 62. The clutch wheel 64 is permanently driven by any suitable prime-mover such as an electric motor (not shown).

While the embodiment of the present invention as herein disclosed, constitutes a preferred form, it is to be understood that other forms might be adopted, all coming within the scope of the claims which follow.

1. In an apparatus of the character described, the combination of means for forming a beaded blank into a tube; an arbor receiving the tube; means for preventing longitudinal movement of the tube in one direction relative to the arbor; and a single member movable in said one direction for collapsing the bead of the tube on the arbor into an annular shoulder and crimping a tube end portion into a laterally extending flange.

2. In an apparatus of the character described, the combination of means receiving a beaded blank; means including an arbor for forming a blank into a tube with an annular bead; means remote from the forming means for collapsing the bead of the tube on the arbor into an annular shoulder; and means for transferring blanks from the receiving means to the arbor and advancing the blanks on the arbor successively to the forming means and then to the collapsing means.

3. In an apparatus of the character described, the combination of means receiving a beaded blank; means including an arbor for forming a blank into a tube with an annular bead; a single member remote from the forming means for collapsing the bead of the tube on the arbor into an annular shoulder and crimping a tube end portion into a laterally extending flange; and means for transferring blanks from the receiving means to the arbor and advancing the blanks on the arbor successively to the forming means and then to said single member.

4. In an apparatus of the character described, the combination of means for intermittently feeding a strip of material; means for beading the strip between feeding steps; means for severing beaded blanks from the strip; means including an arbor for forming a blank into a tube with an annular bead; means remote from the forming means for collapsing the bead of the tube on the arbor into an annular shoulder; and means for transferring blanks from the severing means to the arbor and advancing the blanks on the arbor successively to the forming means and then to the collapsing means.

5. In an apparatus of the character described, the combination of an arbor; means for forming a beaded blank around a length of said arbor into tube shape with the bead annularly projecting therefrom; means remote from the forming means for clamping a tube length on one side of and in close proximity to the bead against the arbor; means for advancing a tube on the arbor from the forming means to the clamping means; and a sleeve movable over the tube part on the other side of the bead and having an annular shoulder uniformly engaging said bead where merging into said other side of the tube, said shoulder causing the bead to collapse into an annular flange upon movement of the sleeve against the bead.

6. In an apparatus of the character described, the combination of means for forming a beaded blank into a tube with the bead annularly projecting therefrom; an arbor receiving the tube near one end thereof; means for clamping a tube length on one side of and in close proximity to the bead against the arbor; and a centrally recessed member movable coaxially of the arbor whereby the recess wall moves over the tube part on the other side of the bead, the front surface of the member uniformly engaging the bead where merging into said other side of the tube and collapsing said bead into an annular flange, and the recess bottom engaging and crimping the adjacent end of the tube into an inward flange.

CLARENCE J. KELLER.